US012583161B2

(12) United States Patent
Murata et al.

(10) Patent No.: US 12,583,161 B2
(45) Date of Patent: Mar. 24, 2026

(54) INJECTION MOLDING METHOD AND INJECTION MOLDING MACHINE

(71) Applicant: NISSEI PLASTIC INDUSTRIAL CO., LTD., Nagano-ken (JP)

(72) Inventors: Hirofumi Murata, Hanishina-gun (JP); Kenichi Hayashi, Hanishina-gun (JP)

(73) Assignee: NISSEI PLASTIC INDUSTRIAL CO., LTD., Nagano-Ken (JP)

( * ) Notice: Subject to any disclaimer, the term of this patent is extended or adjusted under 35 U.S.C. 154(b) by 57 days.

(21) Appl. No.: 18/234,689

(22) Filed: Aug. 16, 2023

(65) Prior Publication Data

US 2024/0059002 A1 Feb. 22, 2024

(30) Foreign Application Priority Data

Aug. 17, 2022 (JP) ................................. 2022-129961

(51) Int. Cl.
  *B29C 45/76* (2006.01)
  *B29C 45/67* (2006.01)
(52) U.S. Cl.
  CPC .......... *B29C 45/7653* (2013.01); *B29C 45/67* (2013.01); *B29C 2945/76505* (2013.01); *B29C 2945/76709* (2013.01)
(58) Field of Classification Search
  CPC ................ B29C 45/7653; B29C 45/67; B29C 2945/76505; B29C 2945/76709; B29C 2945/76076; B29C 2945/7609; B29C 2945/76254; B29C 2945/76381; B29C 2945/76933; B29C 2945/76943; B29C 45/7613; B29C 45/80; B29C 45/76; B29C 45/0025; B29C 45/17; B29C 45/561
See application file for complete search history.

(56) References Cited

U.S. PATENT DOCUMENTS

2012/0146260 A1* 6/2012 Murata ................... B29C 45/77
264/328.1

FOREIGN PATENT DOCUMENTS

JP 2007118349 A * 5/2007
JP 2009297912 A * 12/2009
WO WO 2011/161899 A1 12/2011

* cited by examiner

*Primary Examiner* — S. Behrooz Ghorishi
(74) *Attorney, Agent, or Firm* — Birch, Stewart, Kolasch & Birch, LLP

(57) ABSTRACT

A predetermined mold gap is provided beforehand between a movable mold and a stationary mold of a mold by a mold clamping device. A mold clamping pressure is set to zero, and a predetermined back pressure is set for the movable mold. Subsequently, the injection device is caused to start injection of the molten resin into the mold for which the mold gap, the mold clamping pressure, and the back pressure have been set. When a predetermined injection end condition set beforehand is satisfied as a result of progress of an injection filling process, a filling end process of ending the injection filling process is performed.

3 Claims, 7 Drawing Sheets

Fig.2

Mold Clamping Pressure
Pc=0

INJECTION MOLDING METHOD AND INJECTION MOLDING MACHINE

TECHNICAL FIELD

The present invention relates to an injection molding method and an injection molding machine which perform molding by injecting and filling a plasticized molding material (molten resin) by an injection device into a mold clamped by a mold clamping device.

BACKGROUND ART

In a conventional molding method using an injection molding machine, in general, mold clamping is performed through application of high pressure (large mold clamping force) to the mold. However, since this general mold clamping method involves an increase in energy consumption resulting from application of high pressure (large mold clamping force), this general mold clamping method is not necessarily a desirable method from the viewpoint of energy saving. Therefore, there has been demanded a molding method which performs mold clamping by applying a bare minimum mold clamping force, while securing the high quality and homogeneity of molded products, and the present applicant has proposed a new molding method which meets this demand (see Patent Literature 1).

A method of molding using an injection molding machine disclosed in Patent Literature 1 has an object of securing the high quality of molded products, simplifying molding conditions and facilitating setting of the molding conditions, shortening molding cycle time, and enhancing productivity and economical efficiency. This object has been achieved by the method in which a predetermined mold gap is produced by a relation of force between an always constant molding-mold clamping force and a constant molding injection pressure, which are applied to resin filled into a mold, and natural compression is caused by the molding-mold clamping force even after resin filling ends. Specifically, molding is performed by injecting and filling resin, under a predetermined injection pressure, by an injection device into a mold composed of a stationary mold and a movable mold clamped by a mold clamping device with a predetermined mold clamping force. A mold clamping device which allows compression (natural compression) of the resin as a result of solidification of at least the resin within the mold is used as the mold clamping device. An injection pressure (molding injection pressure) and a mold clamping force (molding mold clamping force) which produce a predetermined gap (mold gap) between the movable mold and the stationary mold at the time of injection filling and enable molding of defect-free products are obtained and set in advance. Furthermore, at the time of production, the mold clamping device is clamped with the molding mold clamping force, the molding injection pressure is set as a limit pressure, and the resin is injected and filled into the mold by driving the injection device. Subsequently, after elapse of a predetermined cooling time, a molded product is taken out.

SUMMARY OF INVENTION

Technical Problem

However, the above-described method of molding using an injection molding machine disclosed in Patent Literature 1 has the following problems to be solved.

First, although no problem occurs in the case where a molding material is resin of low viscosity (high fluidity), in the case where the molding material is resin of low fluidity (high viscosity), filling of the resin into the cavity of the mold is not performed smoothly, which may result in generation of molding defects due to shortage of resin, may result in generation of variation among molded products (deterioration of homogeneity), and may render molding (production) difficult depending on the combination of the resin of low fluidity (high viscosity) and the shape of the mold cavity.

Second, although the above-described molding method realizes high energy savings because of its molding principle, in the case where the molding material is resin of low fluidity, flow resistance increases, and molding cycle tends to become long. Therefore, the above-described molding method is not necessarily satisfactory from the viewpoint of enhancing energy saving performance through improvement of the molding method and reducing costs through reduction of the number of components, and still has room for further improvement.

An object of the present invention is to provide an injection molding method and an injection molding machine which have solved the above-described problems present in the background art.

Solution to Problem

In order to solve the above-described object, an injection molding method according to the present invention is adapted to perform molding by injecting and filling a plasticized molten resin Rm by an injection device Mi into a mold D clamped by a mold clamping device Mc.

The injection molding method is characterized by comprising:

providing a predetermined mold gap Lg beforehand between a movable mold Dm and a stationary mold Dc of the mold D by the mold clamping device Mc, setting a mold clamping pressure Pc to zero and setting a predetermined back pressure Pb for the movable mold Dm, subsequently, starting injection of the molten resin Rm (S7) by the injection device Mi into the mold D for which the mold gap Lg, the mold clamping pressure Pc, and the back pressure Pb have been set, and performing, when a predetermined injection end condition set beforehand (S9) is satisfied as a result of progress of an injection filling process (S8), a filling end process (S10) of ending the injection filling process (S8).

In order to solve the above-described object, an injection molding machine M according to the present invention includes a molding machine controller 2 and is adapted to perform molding by injecting and filling a plasticized molten resin Rm by an injection device Mi into a mold D clamped by a mold clamping device Mc.

The injection molding machine M is characterized in that the molding machine controller 2 comprises:

mold clamping control means Fc for providing a predetermined mold gap Lg between a movable mold Dm and a stationary mold Dc of the mold D by controlling the mold clamping device Mc, for setting a mold clamping pressure Pc to zero, and for setting a predetermined back pressure Pb for the movable mold Dm; and injection control means Fi for performing an injection filling process of injecting and filling the molten resin Rm, by controlling the injection device Mi, into the mold D for which the mold gap Lg, the mold clamping pressure Pc, and the back pressure Pb have been set, and a filling end process of ending the injection filling process when a predetermined injection end condition set beforehand is satisfied as a result of the injection filling process.

Meanwhile, in preferred modes of the invention, it is desired that the molten resin Rm is a low fluidity molding material. Meanwhile, when the injection molding method is carried out, the injection end condition (S9) may be that the movable mold Dm reaches a compression start position Xp set beforehand, and the filling end process (S10) includes a compression process (S12 to S13) of pressurizing the resin Rd within the mold D by the movable mold Dm. Alternatively, the injection end condition (S9) may be that a filling incomplete time Ts set beforehand elapses (S15) after start of the injection filling process (S7), and the filling end process (S10) includes a compression process (S12 to S13) of pressurizing the resin Rd within the mold D by the movable mold Dm. Furthermore, it is desired that the injection device Mi and the mold clamping device Mc are driven by a hydraulic circuit 3 including a hydraulic pump 3p, and the injection device Mi and the mold clamping device Mc are driven by the common hydraulic pump 3p. Also, the mold clamping device Mc may be configured to include a movable platen 5 which is supported by a tie bar mechanism section 4 to be movable forward and rearward and which supports the movable mold Dm, a mold clamping platen 7 which is supported by the tie bar mechanism section 4 to be movable forward and rearward and which includes a mold clamping drive mechanism section 6 for performing clamping of the movable mold Dm, and a chuck mechanism section 8 which is integrally provided on the mold clamping platen 7 and can fix the mold clamping platen 7 at a predetermined position on the tie bar mechanism section 4. It is desired that the mold clamping drive mechanism section 6 uses a mold clamping cylinder 6c, and a meter-out circuit 9 is connected to the mold clamping cylinder 6c.

Advantageous Effects of Invention

The injection molding method and the injection molding machine M according to the present invention yield remarkable effects as follows.

(1) Filling of the resin into the cavity of the mold D can be performed smoothly despite the molding material (the molten resin Rm) being low in fluidity (high in viscosity). As a result, it is possible to suppress generation of molding defects due to shortage of resin and generation of variation among molded products (deterioration of homogeneity), thereby improving the quality of molded products, to avoid the problem that molding (production) becomes difficult depending on the type of the molding material R, and to expand the range of molding materials R which can be used for injection molding, thereby enhancing universality and evolvability for objects to be molded. In addition, since a sudden mold opening behavior due to the back pressure can be prevented, a natural flow can be realized.

(2) Since the flow resistance produced when the molten resin Rm is injected and filled into the cavity of the mold D can be reduced and consequently, the molding cycle can be shortened, energy saving performance can be further enhanced. Namely, since positive application of mold clamping force (drive force) to the mold clamping device Mc at the time of injection filling becomes unnecessary, energy consumption can be reduced greatly, and the structure of the mold clamping mechanism can be simplified, which contributes to cost reduction through reduction of components.

(3) In a preferred mode in which a low fluidity molding material is used as the molten resin Rm, it is possible to provide an injection molding method (an injection molding machine M) which is the most suitable for molded products using a low fluidity molding material.

(4) In a preferred mode of the injection molding method in which the condition that the movable mold Dm reaches the compression start position Xp set beforehand is used as the injection end condition (S9), and the filling end process (S10) includes the compression process (S12 to S13) for pressurizing the resin Rd within the mold D by the movable mold Dm, since a process for compressing the resin Rd can be performed after the resin Rd is filled, it is possible to provide an injection molding method which is the most suitable from the viewpoint of, for example, performing compression molding for molded products using a low fluidity molding material or the like.

(5) In preferred mode of the injection molding method in which the condition that a filling incomplete time Ts set beforehand elapses (S15) after start of the injection filling process (S7) is used as the injection end condition (S9), and the filling end process (S10) includes a compression process (S12 to S13) of pressurizing the resin Rd within the mold D by the movable mold Dm, even in the case where the movable platen 5 fails to reach the compression start position Xp within the set filling incomplete time Ts due to, for example, a combination of the type of the low fluidity molding material and the shape of the mold cavity, compression molding by performing the compression process (S12 to S13) becomes possible. Thus, it is possible to reduce molding defects due to shortage of resin, thereby increasing the yield of molded products.

(6) In a preferred mode of the injection molding method in which the injection device Mi and the mold clamping device Mc are driven by the hydraulic circuit 3 including the hydraulic pump 3p, since impact absorbing characteristics based on hydraulic pressure can be utilized, it is possible to carry out the injection molding method according to the present invention in an optimal form. In particular, it is possible to absorb an impact applied to the resin Rd at the time of injection filling, thereby contributing to improvement of molding quality.

(7) In a preferred mode of the injection molding method in which the injection device Mi and the mold clamping device Mc are driven by the common hydraulic pump 3p, the number of hydraulic pumps can be reduced, which contributes to remarkable cost reduction. Namely, in the injection molding method according to the present invention, at the time of injection filling, only the back pressure control for the mold clamping device Mc is necessary and drive force by the hydraulic pump becomes unnecessary. Therefore, of two hydraulic pumps; i.e., the hydraulic pump on the injection device Mi side and the hydraulic pump on the mold clamping device Mc side, which normally become necessary at the time of injection filling, the hydraulic pump on the mold clamping device Mc side becomes unnecessary.

(8) In a preferred mode of the injection molding machine M in which the mold clamping device Mc is configured to include the movable platen 5 which is supported by the tie bar mechanism section 4 to be movable forward and rearward and which supports the movable mold Dm, the mold clamping platen 7 which is supported by the tie bar mechanism section 4 to be movable forward and rearward and which includes the mold clamping drive mechanism section 6 for performing clamping of the movable mold Dm, and the chuck mechanism section 8 which is integrally provided on the mold clamping platen 7 and can fix the mold clamping platen 7 at a predetermined position on the tie bar mechanism section 4, it is possible to secure easiness of implementation and certainty of implementation; for example, it is possible to easily and reliably carry out the injection molding method according to the present invention.

(9) In a preferred mode of the injection molding machine M in which the mold clamping cylinder 6c is used in the mold clamping drive mechanism section 6, since the hydraulic circuit 3 including the mold clamping cylinder 6c can be utilized, by virtue of impact absorbing characteristics of the hydraulic circuit 3 for resin Rd at the time of injection filling, molding quality can be improved.

(10) In a preferred mode of the injection molding machine M in which the meter-out circuit 9 connected to the mold clamping cylinder 6c is provided, since the meter-out circuit 9 can be realized merely by adding the relatively simple hydraulic circuit 3, the meter-out circuit 9 can be practiced easily at low cost. Additionally, the back pressure control in the injection molding method according to the present invention can be performed easily and reliably.

BRIEF DESCRIPTION OF DRAWINGS

FIG. 2 is a configurational diagram of an injection molding machine used in practicing the injection molding method;

DESCRIPTION OF EMBODIMENTS

Figure 1:
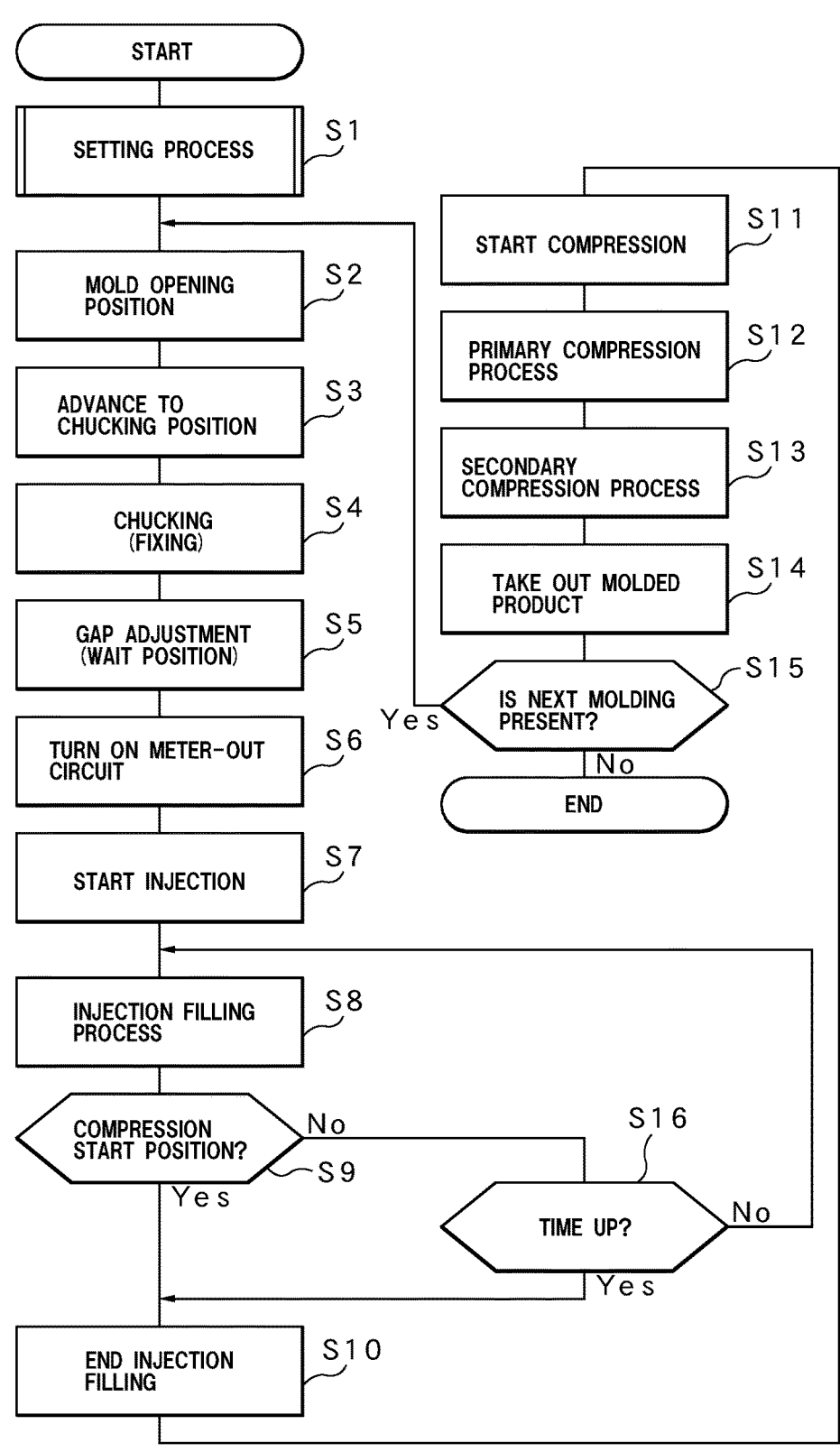
FIG. 1 is a flowchart used for describing processing steps of an injection molding method according to a preferred embodiment of the present invention.

Next, a preferred embodiment of the present invention will be described in detail based on the drawings.

First, the structure of an injection molding machine M which can carry out an injection molding method according to the present embodiment will be described with reference to FIGS. 2 to 4.

Figure 2:
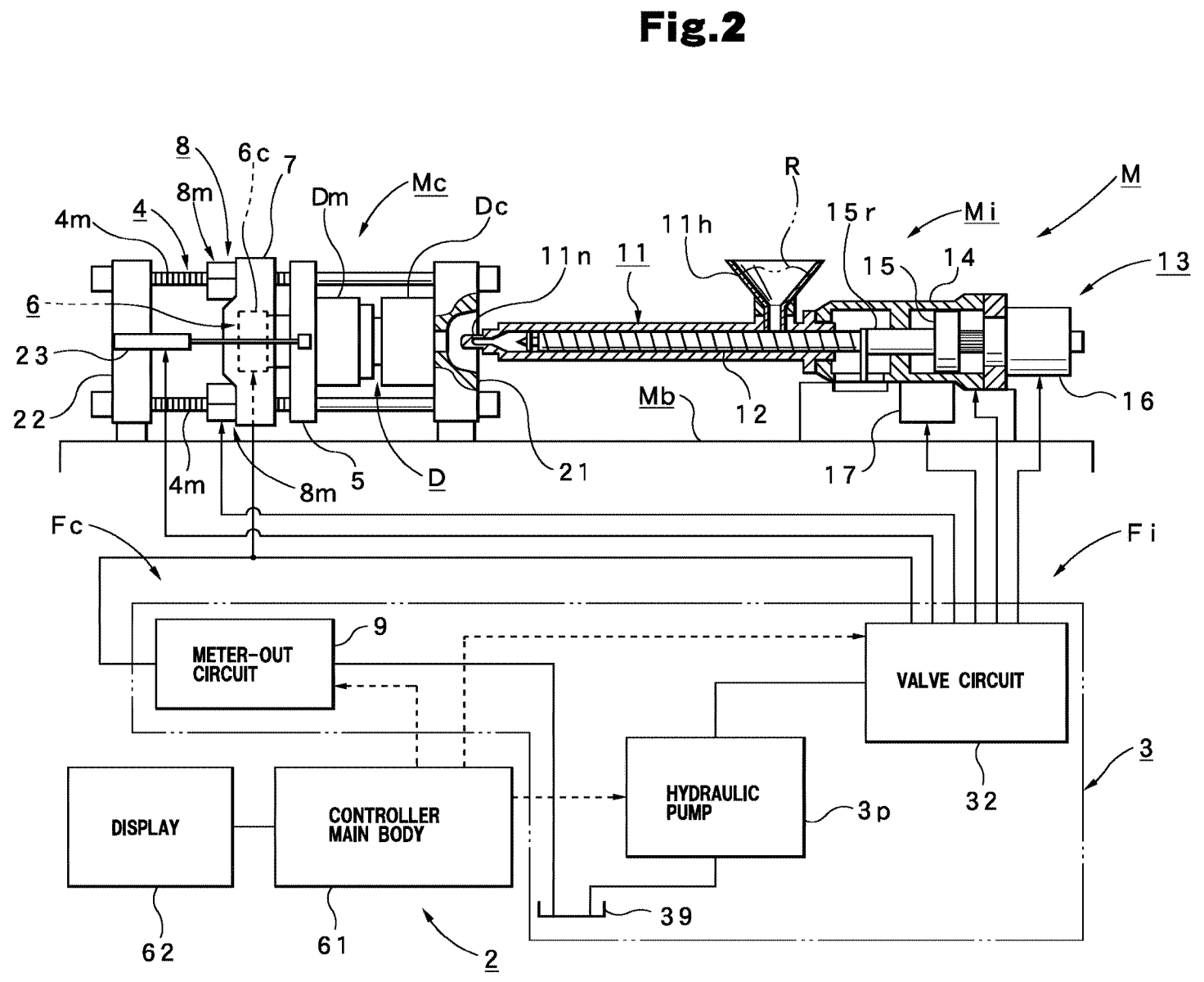

In FIG. 2, the injection molding machine is denoted by reference sign M and includes an injection device Mi and a mold clamping device Mc, which are disposed on a top surface of a machine base Mb.

The injection device Mi is disposed on the machine base Mb such that the injection device Mi can move forward and rearward. The injection device Mi includes a heating cylinder 11 having an injection nozzle 11n at its forward end and a hopper 11h at its rear portion. A screw 12 is inserted into an internal space of the heating cylinder 11, and a screw drive section 13 is disposed at a rear end of the heating cylinder 11. The screw drive section 13 has an injection cylinder 14 including a single-rod-type injection ram 15. A ram rod 15r projecting forward from the injection ram 15 is coupled to a rear end of the screw 12. A shaft of a metering motor (oil motor) 16 attached to the injection cylinder 14 is splined-coupled to a rear end of the injection ram 15. Reference sign 17 denotes an injection device moving cylinder which moves the injection device Mi forward and rearward, thereby establishing nozzle touch to the mold D or cancelling the nozzle touch.

The mold clamping device Mc includes, as a basic structure, a movable platen 5 which is supported by a tie bar mechanism section 4 to be movable forward and rearward and which supports a movable mold Dm, a mold clamping platen 7 which is supported by the tie bar mechanism section 4 to be movable forward and rearward and which includes a mold clamping drive mechanism section 6 for performing clamping of the movable mold Dm, and a chuck mechanism section 8 which is integrally provided on the mold clamping platen 7 and can fix the mold clamping platen 7 at a predetermined position on the tie bar mechanism section 4.

Figure 3:
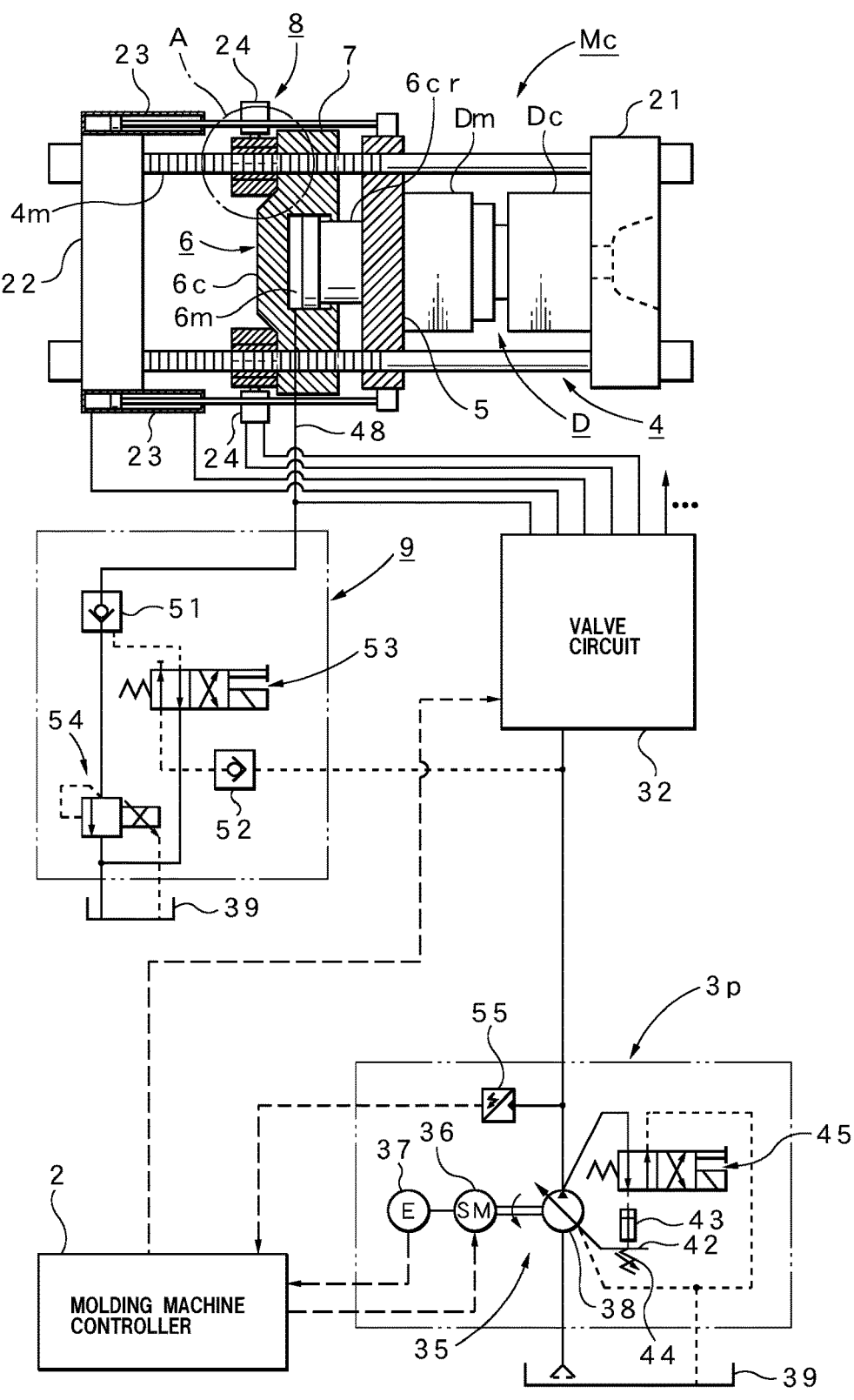
FIG. 3 is a specific circuit diagram showing an extracted main portion of the injection molding machine.

More specifically, as shown in FIGS. 2 and 3, a first stationary plate 21 and a second stationary plate 22 are fixed on the top surface of the machine base Mb such that the first stationary plate 21 and the second stationary plate 22 are separated from each other. Four tie bars 4m are provided to extend parallel between four corners of the first stationary plate 21 and four corners of the second stationary plate 22. The movable platen 5 and the mold clamping platen 7 are slidably supported by the tie bars 4m. As a result, the stationary mold Dc is supported on the forward stationary plate 21, the movable mold Dm is supported on the movable platen 5, and a mold D is constituted by the stationary mold Dc and the movable mold Dm.

As shown in FIG. 3, the mold clamping drive mechanism section 6 is incorporated in the mold clamping platen 7. The mold clamping drive mechanism section 6 is composed of a single-rod-type mold clamping cylinder 6c, and an end of a forwardly projecting mold clamping ram 6cr is fixed to a back surface of the movable platen 5. In the case where the mold clamping cylinder 6c is used in the mold clamping drive mechanism section 6, since a hydraulic circuit 3 which will be described later and includes the mold clamping cylinder 6c can be utilized, by virtue of impact absorbing characteristics of the hydraulic circuit 3 for resin Rd at the time of injection filling, molding quality can be improved. Notably, reference signs 23 and 23 denote left and right single-rod-type mold opening/closing cylinders provided between the rear stationary plate 22 and the movable platen 5.

The chuck mechanism section 8 is disposed on the back surface (on the side toward the second stationary plate 22) of the mold clamping platen 7. The chuck mechanism section 8 is composed of four chuck sections 8m corresponding to the four tie bars 4m. The structure of one tie bar 4m will be described (other tie bars 4m have the same structure). As shown in FIG. 4, the tie bar 4m has annular grooves 25s formed on its outer circumferential surface at predetermined intervals along the axial direction. Notably, a range in which the grooves 25s are provided is chosen such that the chuck section 8m effectively functions at least over the entire moving range of the mold clamping platen 7 in the axial direction.

The structure of one chuck section 8*m* will be described (other chuck sections 8*m* have the same structure). The chuck section 8*m* includes upper and lower chuck halves (half nuts) 8*mu* and 8*md* and is configured to chuck the tie bar 4*m* by sandwiching it by the chuck halves 8*mu* and 8*md*. In the case of the illustrated example, as shown in FIG. 4, an engagement portion 7*r* having a guiderail mechanism is provided on the back surface of the mold clamping platen 7, the upper and lower chuck halves 8*mu* and 8*md* are engaged with the engagement portion 7*r* to be movable upward and downward, respectively, and the chuck section 8*m* is configured such that the upper and lower chuck halves 8*mu* and 8*md* can be moved in directions opposite to each other by a link mechanism. A chuck cylinder 24 is coupled to one chuck half 8*mu* so as to move the upper and lower chuck halves 8*mu* and 8*md* upward and downward, respectively. Annular protrusions 25*t* which are fitted into the grooves 25*s* provided on the outer circumferential surface of the tie bar 4*m* are formed on inner circumferential surfaces of the upper and lower chuck halves 8*mu* and 8*md*.

Figure 4:
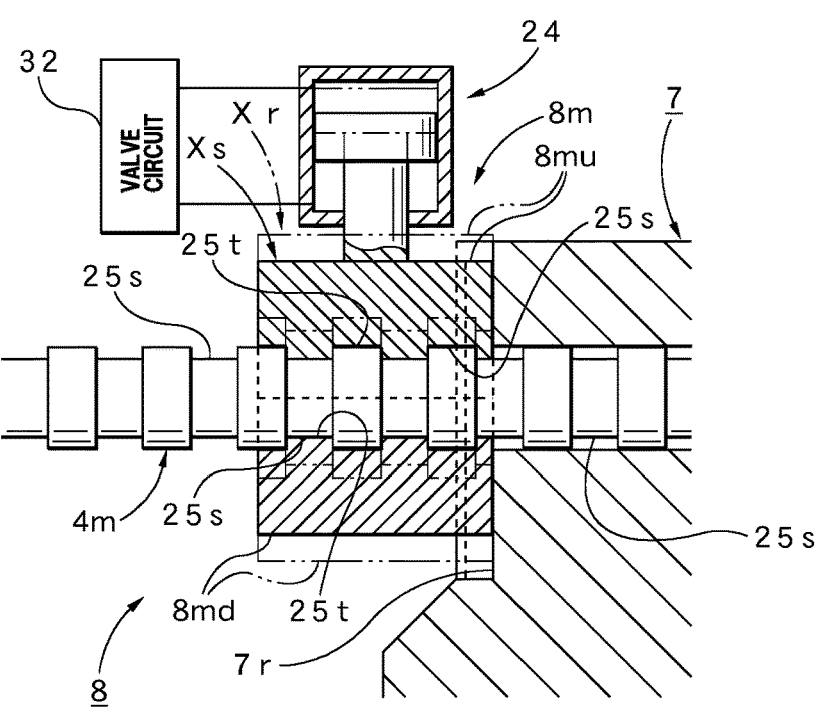
FIG. 4 is an enlarged cross-sectional view of a chuck mechanism section of a mold clamping device of the injection molding machine; specifically, a portion of FIG. 3 in a dot-dashed circle A.

By virtue of the above-described configuration, when the piston ram of the chuck cylinder 24 shown in FIG. 4 is forced to project, the chuck halves 8*mu* and 8*md* move to respective chucking positions Xs; i.e., the positions of the chuck halves 8*mu* and 8*md* shown by a solid cross section. As a result, the protrusions 25*t* engage with the grooves 25*s*, thereby fixing the mold clamping platen 7. When the piston ram of the chuck cylinder 24 is retreated, the chuck halves 8*mu* and 8*md* move to respective chucking cancellation positions Xr; i.e., the positions of the chuck halves 8*mu* and 8*md* shown by imaginary lines. As a result, the protrusions 25*t* are disengaged from the grooves 25*s*, thereby permitting movement of the mold clamping platen 7 in the axial direction. Notably, the illustrated structure of the chuck section 8*m* is one example, and the chuck section 8*m* may be configured, for example, such that, since four chuck sections 8*m* are provided, the inner circumferential surfaces of the chuck halves 8*md* are made flat, and the protrusions 25*t* are provided only on the inner circumferential surfaces of the chuck halves 8*mu*. Basically, the chuck section 8*m* can be replaced with any of various known mechanisms having the same functions.

In the case where, as described above, the mold clamping device Mc is configured to include the movable platen 5 which is supported by the tie bar mechanism section 4 to be movable forward and rearward and which supports the movable mold Dm, the mold clamping platen 7 which is supported by the tie bar mechanism section 4 to be movable forward and rearward and which includes the mold clamping drive mechanism section 6 (the mold clamping cylinder 6*c*) for performing clamping of the movable mold Dm, and the chuck mechanism section 8 which is integrally provided on the mold clamping platen 7 and can fix the mold clamping platen 7 at a predetermined position on the tie bar mechanism section 4, it is possible to secure easiness of implementation and certainty of implementation; for example, it is possible to easily and reliably carry out the injection molding method according to the present invention.

Meanwhile, the hydraulic circuit denoted by reference sign 3 includes, as a main portion, a variable-delivery-type pump 3*p* serving as a hydraulic drive source, a valve circuit 32 which performs various types of switching and control, and a meter-out circuit 9 which is connected to the mold clamping cylinder 6*c* according to the present invention. In the case where, as described above, the injection device Mi and the mold clamping device Mc are driven by the hydraulic circuit 3 including the hydraulic pump 3*p*, since the impact absorbing characteristics based on hydraulic pressure can be utilized, it is possible to carry out the injection molding method according to the present invention in an optimal form. In particular, it is possible to absorb an impact applied to the resin Rd at the time of injection filling, thereby contributing to improvement of molding quality.

As shown in FIG. 3, the hydraulic pump 3*p* includes a pump unit 35 and a servo motor 36 which rotatively drives the pump unit 35. Notably, reference sign 37 denotes a rotary encoder for detecting the rotational speed of the servo motor 36. The pump unit 35 includes a pump body 38 composed of a swash-plate-type piston pump. Therefore, the pump unit 35 has a swash plate 42. When the inclination angle of the swash plate 42 (swash plate angle) is increased, the stroke of a pump piston in the pump body 38 increases, and the discharge flow rate of the pump unit increases. When the swash plate angle is decreased, the stroke of the pump piston decreases and the discharge flow rate of the pump unit decreases. As a result, by setting the swash plate angle to a predetermined angle, it becomes possible to set a fixed discharge flow rate at which the discharge flow rate (the maximum capacity) is fixed to a predetermined magnitude. A control cylinder 43 and a return spring 44 are additionally provided for the swash plate 42, and the control cylinder 43 is connected to a discharge port of the pump unit 35 (the pump body 38) via a switching valve (electromagnetic valve) 45. As a result, the angle of the swash plate 42 (swash plate angle) can be changed by controlling the control cylinder 43.

An intake port of the pump unit 35 is connected to an oil tank 39, and the discharge port of the pump unit 35 is connected to a primary side of the valve circuit 32. A secondary side of the valve circuit 32 is connected to the injection cylinder 14, the metering motor 16, the injection device moving cylinder 17, the mold clamping cylinder 6*c*, the mold opening/closing cylinders 23, the chuck cylinders 24, which have been described above, and is also connected to other actuators of various types such as an unillustrated ejector cylinder. Therefore, the valve circuit 32 includes switching valves (electromagnetic valves) connected to these actuators. Each switching valve is composed of one or more valve components, necessary additional hydraulic components, etc. and has a switching function associated with supply of working fluid, stoppage of the working fluid, and discharge of the working fluid at least for the injection cylinder 14, the metering motor 16, the injection device moving cylinder 17, the mold clamping cylinder 6*c*, the mold opening/closing cylinders 23, the chuck cylinders 24, which have been described above, and for other actuators of various types such as an unillustrated ejector cylinder. Thus, the discharge flow rate and discharge pressure of the variable-delivery-type hydraulic pump 31 can be changed by variably controlling the rotational speed of the servo motor 36.

Furthermore, as shown in FIG. 3, a flow-in side of the meter-out circuit 9 is connected to a working fluid line 48 connected to an oil chamber (rear oil chamber) 6*mr* of the mold clamping cylinder 6*c*, and a flow-out side of the meter-out circuit 9 is connected to the oil tank 39. The meter-out circuit 9 includes check valves 51 and 52, a directional control valve (electromagnetic valve) 53, and a relief valve (back pressure control valve) 54, which are connected as shown in FIG. 3.

By virtue of this configuration, in the case of the present embodiment, in an injection filling step, control for the mold clamping device Mc can be performed only by back pressure control using the meter-out circuit 9. Namely, by virtue of the function of the meter-out circuit 9, when the pressure of the resin Rd within the mold D is equal to lower than a set back pressure Pb [kN], the pressure of the resin Rd is maintained at that pressure. When the pressure of the resin Rd exceeds the back pressure Pb [kN], by virtue of the function of the relief valve 54, the pressure of the resin Rd is maintained at the back pressure Pb [kN].

In the case where the meter-out circuit 9 connected to the mold clamping cylinder 6c is provided as described above, since the meter-out circuit 9 can be realized merely by adding the relatively simple hydraulic circuit 3, the meter-out circuit 9 can be practiced easily at low cost. Additionally, the back pressure control in the injection molding method according to the present invention can be performed easily and reliably. Also, the injection device Mi and the mold clamping device Mc can be driven by the common hydraulic pump 3p. Namely, in the injection molding method according to the present invention, at the time of injection filling, only the back pressure control for the mold clamping device Mc is necessary and drive force by the hydraulic pump becomes unnecessary. Therefore, of two hydraulic pumps; i.e., the hydraulic pump on the injection device Mi side and the hydraulic pump on the mold clamping device Mc side, which normally become necessary at the time of injection filling, the hydraulic pump on the mold clamping device Mc side becomes unnecessary, which contributes to remarkable cost reduction.

Meanwhile, reference sign 2 denotes a molding machine controller. A controller main body 61 and a display 62 are contained in the molding machine controller 2. The above-described servo motor 36 is connected to a servo amplifier output port of the controller main body 61, and the valve circuit 32 is connected to a control signal output port of the controller main body 61. Encoder pulses obtained from the rotary encoder 37 are input to a servo amplifier of the controller main body 61. Notably, reference sign 55 denotes a pressure sensor for detecting the pressure of the working fluid supplied to the primary side of the valve circuit 32. The pressure detected by the pressure sensor 55 is given to the controller main body 61 of the molding machine controller 2.

The controller main body 61 includes hardware such as a CPU, an internal memory, etc. and provides a computer function. Accordingly, a control program (software) for executing various types of control processes (sequence control) is stored in the internal memory, and a data memory for storing various types of data (database) is contained. The control program includes a control program for realizing at least a portion of the injection molding method according to the present embodiment.

Figure 5:
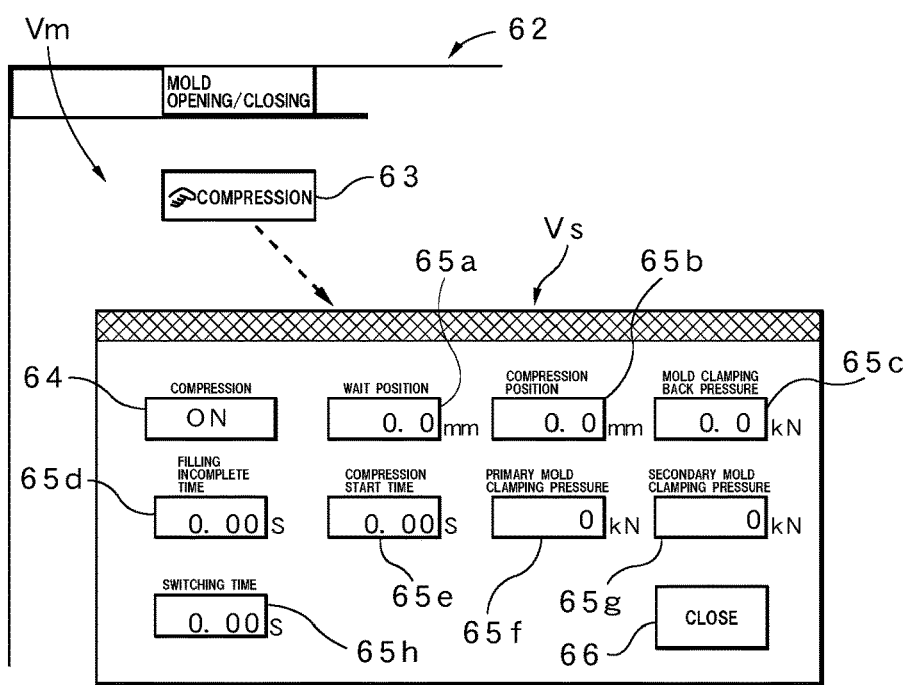
FIG. 5 is a setting screen illustration showing a portion of a display in a molding machine controller of the injection molding machine.

The display 62 can perform various types of displays, and a touch panel is added thereto. This touch panel enables various types of setting operations, selecting operations, etc. FIG. 5 shows a setting screen which is used for performing the injection molding method according to the present embodiment; in particular, a state in which a mold opening/closing screen Vm is displayed. Since a "compression" switch 63 is provided on this mold opening/closing screen Vm, by turning on this "compression" switch 63, a setting screen Vs used in the injection molding method according to the present embodiment can be displayed in a window. This setting screen Vs has a compression ON/OFF selection key 64, a wait position setting section 65a for setting a wait position [mm] of the movable platen 5 before injection, a compression position setting section 65b for setting a compression start position [mm], a mold clamping back pressure setting section 65c for setting a mold clamping holding pressure (back pressure) [kN] during injection, a filling incomplete time setting section 65d for setting a filling incomplete time Ts [sec] in the case of a failure to move to the wait position, a compression start time setting section 65e for setting a compression start time Ti [sec], a primary mold clamping pressure setting section 65f for setting a compression pressure [kN] for primary mold clamping, a secondary mold clamping pressure setting section 65g for setting a compression pressure [kN] for secondary mold clamping, and a switching time setting section 65h for setting a switching time [sec] for switching to the secondary mold clamping. Notably, reference sign 66 denotes a "close" key of the setting screen Vs.

Next, the injection molding method according to the present embodiment which is performed by using the injection molding machine M will be described step by step according to the flowchart shown in FIG. 1 and with reference to mainly FIGS. 6 to 10.

When the injection molding method according to the present embodiment is performed, first a setting process is performed (step S1). In this setting process, various types of ordinary molding conditions are set, and the above-described various type of items relating to the injection molding method according to the present embodiment are set by using the setting screen Vs shown in FIG. 5.

Figure 6:
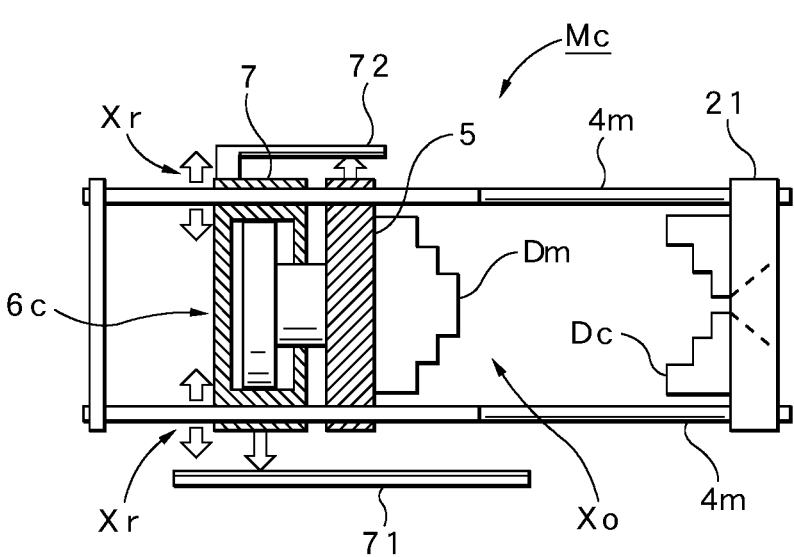
FIG. 6 is a schematic view showing a state of the injection molding machine.

It is assumed that the mold clamping device Mc (the movable mold Dm) is currently located at a mold opening position Xo shown in FIG. 6 (step S2). The mold clamping device Mc (the movable mold Dm) has been moved to this mold opening position Xo as a result of the chuck sections 8m being switched to the chucking cancellation position Xr through drive control of the chuck cylinders 24, the movable platen 5 being moved to the most retreated position (the second stationary plate 22 side) through drive control of the mold clamping cylinder 6c, and the movable platen 5 and the mold clamping platen 7 being retreated through drive control of the mold opening/closing cylinders 23. Notably, in FIG. 6, reference sign 71 denotes an encoder for detecting the position of the mold clamping platen, and reference sign 72 denotes an encoder for detecting the position of the movable platen.

Figure 7:
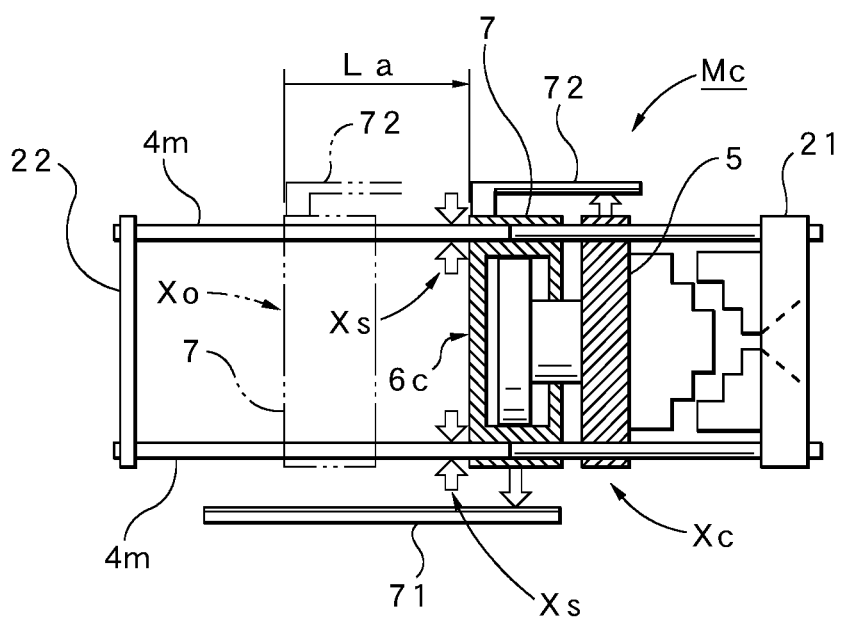
FIG. 7 is a schematic view showing another state of the injection molding machine.

At the time of production, by driving and controlling the mold opening/closing cylinders 23, the movable platen 5 and the mold clamping platen 7 are advanced at high speed from the mold opening position Xo to a chucking position Xc shown in FIG. 7 (step S3). When they reach the chucking position Xc, by driving and controlling the chuck cylinders 24, the chuck sections 8m are switched to the chucking positions Xs, thereby fixing the mold clamping platen 7 to the tie bars 4m (step S4). Notably, in FIG. 7, reference sign La denotes the movement stroke of the mold clamping platen 7 from the mold opening position Xo to the chucking position Xc.

Figure 8:
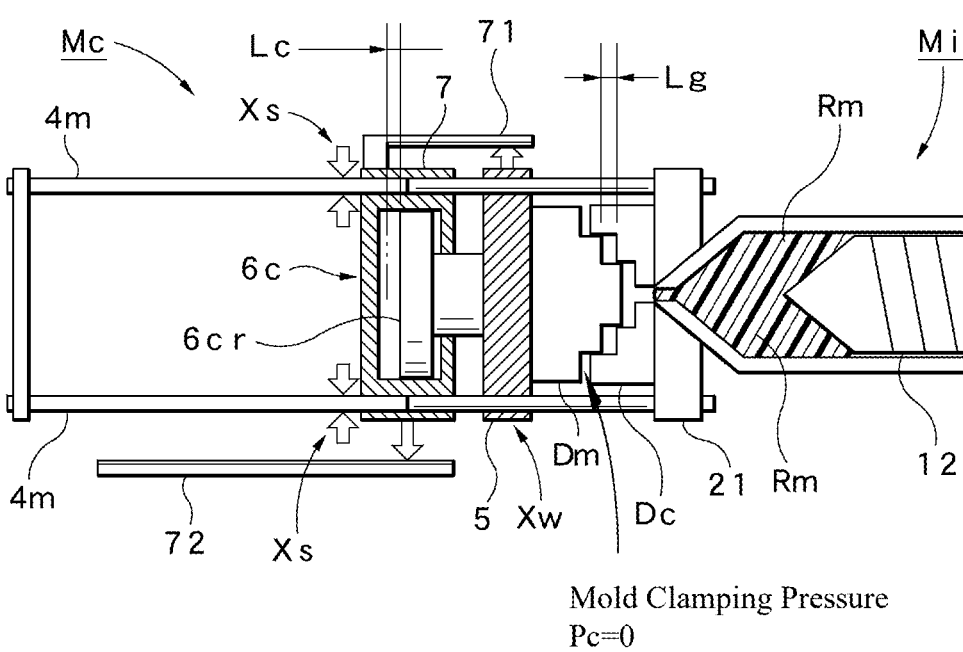
FIG. 8 is a schematic view showing another state of the injection molding machine.

Next, by driving and controlling the mold clamping cylinder 6c, the movable platen 5 is advanced, and, by adjusting the gap between the movable mold Dm and the stationary mold Dc, the movable mold Dm is set to a set wait position Xw shown in FIG. 8 (step S5). A set mold gap Lg is provided between the movable mold Dm and the stationary mold Dc at that time. In FIG. 8, reference sign Lc denotes the movement stroke of the mold clamping ram 6cr at the time of adjustment. As a result, preparation for starting injection on the mold clamping device Mc side is completed. Therefore, the directional control valve 53 of the meter-out circuit 9 is switched to a meter-out ON side (step S6).

Meanwhile, in the injection device Mi, the screw 12 rotates as a result of drive control of the metering motor 16.

Consequently, a molding material R supplied to the hopper 11*h* is plasticized, and a plasticized molten resin Rm is accumulated in front of the screw 12. Also, as a result of drive control of the injection device moving cylinder 17, the injection device Mi advances to a nozzle touch position shown in FIG. 8. As a result, preparation for starting injection on the injection device Mi side is completed.

Notably, in particular, a low fluidity molding material can be applied to the molding material R. In the case where a low fluidity molding material is applied to the molding material R as described above, it is possible to provide an injection molding method (injection molding machine M) which is most suitable for molded products which uses the low fluidity molding material.

After completion of the above-described preparations for starting injection, injection of the molten resin Rm is started by driving and controlling the injection cylinder 14 (step S7). In this case, immediately before start of injection, the mold gap Lg is present between the movable mold Dm and the stationary mold Dc as described above, injection pressure is zero, and mold clamping force is zero. Therefore, the pressure difference between the forward side and the rear side of the movable platen 5 is zero (balanced state), and the movable platen 5 is in a standstill state.

As result of start of injection, the screw 12 advances, and the molten resin Rm is filled, through the injection nozzle 11*n*, into the cavity of the mold D; i.e., the mold gap Lg between the movable mold Dm and the stationary mold Dc (step S8). In this case, a low fluidity molding material is used as the molding material R. However, since the mold clamping force at the begin is zero, the molten resin Rm is injected and filled into the cavity of the mold D relatively smoothly. With progress of the injection filling process, the pressure of the resin Rd within the mold D increases, and the movable platen 5 retreats gradually because the mold clamping platen 7 is fixed in position by the chuck sections 8*m* in the chucking position Xs. At that time, the pressure of the resin Rd is maintained at the set back pressure [kN] by the function of the meter-out circuit 9.

Figure 9:
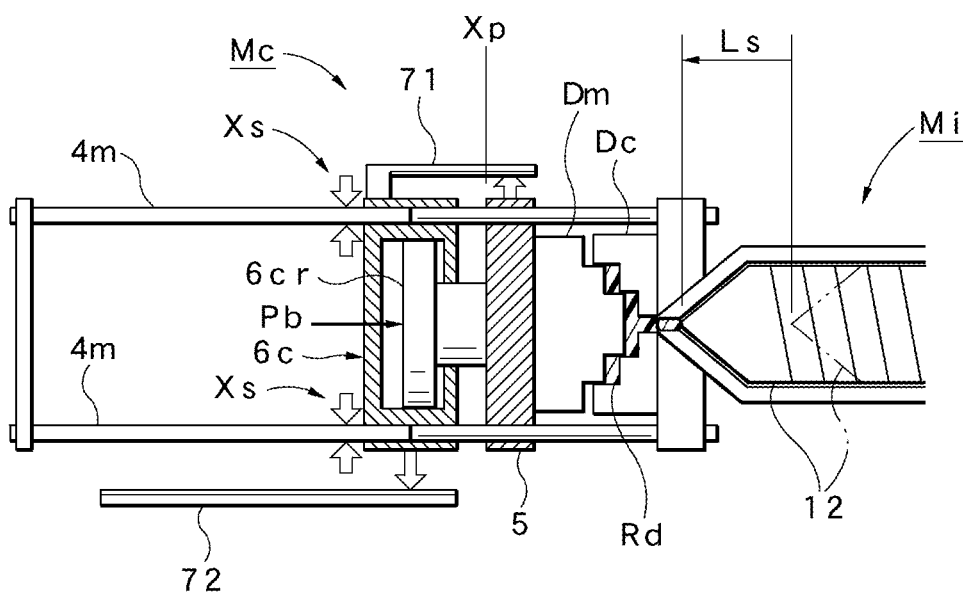
FIG. 9 is a schematic view showing another state of the injection molding machine.

When the movable platen 5 reaches a set compression start position Xp as shown in FIG. 9, an end process for ending the injection filling process is performed (steps S9 and S10). At that time, the screw 12 advances to a position near a most advanced position. In FIG. 9, reference sign Ls denotes the movement stroke of the screw 12 at the time of injection filling, and reference sign Pb denotes the back pressure [kN] applied to the mold clamping ram 6*cr*. Therefore, in this case, an injection end condition is that the movable platen 5 reaches the compression start position Xp.

Figure 10:
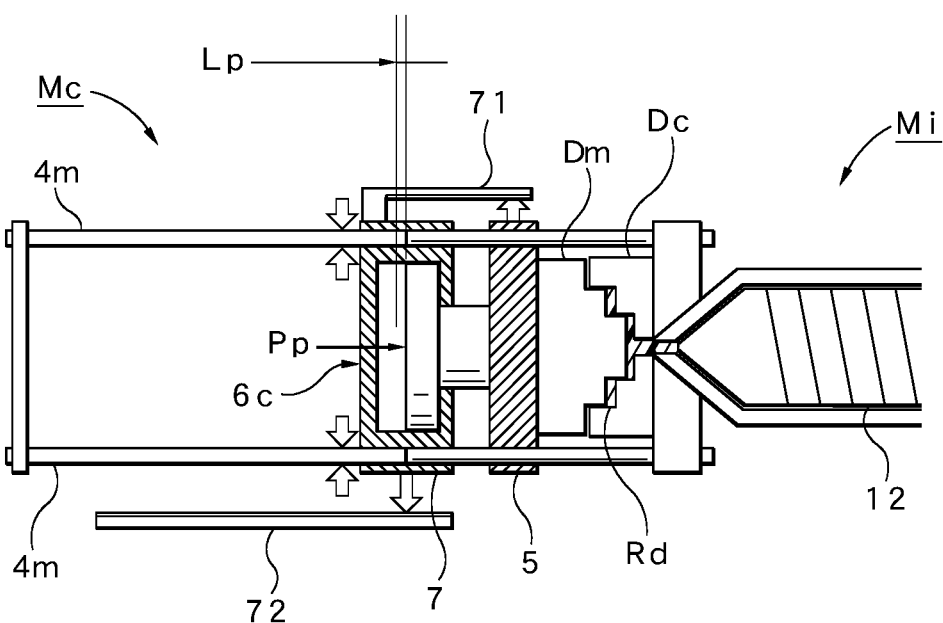
FIG. 10 is a schematic view showing another state of the injection molding machine.

Subsequently, when a compression start time Ti (sec) set by the compression start time setting section 65*e* comes, a compression process for pressurizing the resin Rd within the mold D by the movable mold Dm is started (step S11). In this case, the compression start time may include "0." In the compression process, the meter-out circuit 9 is switched to an OFF state, and, by driving and controlling the mold clamping cylinder 6*c*, the movable platen 5 is pressed forward (toward the first stationary plate 21 side) with a predetermined pressing force Pp as shown in FIG. 10. In FIG. 10, reference sign Lp denotes the amount of displacement of the mold clamping ram 6*cr* due to the pressing force Pp; i.e., a compression amount.

In the case where, as described above, the condition that the movable mold Dm reaches the compression start position Xp set beforehand is used as the injection end condition, and the filling end process includes the compression process for pressurizing the resin Rd within the mold D by the movable mold Dm, since a process for compressing the resin Rd can be performed after the resin Rd is filled, it is possible to provide an injection molding method which is the most suitable from the viewpoint of, for example, performing compression molding for molded products using a low fluidity molding material or the like.

Also, as shown in FIG. 5, the illustrated compression process is set by the primary mold clamping pressure [kN] and the secondary mold clamping pressure [kN]. Therefore, at the time of the compression process, a primary compression process is first performed with the primary mold clamping pressure (step S12). Subsequently, when the switching time (sec) comes, the compression pressure is switched to the secondary mold clamping pressure (step S13). After completion of the compression process, mold opening is performed, and a process for ejecting a molded product is performed (step S14). Furthermore, in the case where the next production is continuously performed, the same molding process is performed (steps S15, S2, . . . ).

Since a low fluidity molding material is used as the molding material R, it is expected a case where, in the injection filling process (step S8), the movable platen 5 needs time to reach the compression start position Xp. In this case, when the set filling incomplete time Ts [sec] elapses before the movable platen 5 reaches the compression start position Xp, the injection filling process is ended even when the movable platen 5 does not reach the compression start position Xp (steps S9, S16, and S10). Therefore, when the filling incomplete time Ts elapses, the compression process for pressurizing the resin Rd within the mold D by the movable mold Dm is started (step S11). In this case, the condition that the filling incomplete time (filing time) Ts set beforehand elapses from the start of the injection filling process becomes the injection end condition. Notably, the compression process and processes subsequent thereto are the same as those in the case where the movable platen 5 has reached the compression start position Xp. Namely, the primary compression process with the primary mold clamping pressure, the secondary compression process with the secondary mold clamping pressure, and the molded product ejection process are performed (steps S12 to S14).

As described above, the condition that the filling incomplete time (filing time) Ts set beforehand elapses from the start of the injection filling process is used as the injection end condition, and the filling end process includes the compression process for pressurizing the resin Rd within the mold D by the movable mold Dm. Thus, even in the case where the movable platen 5 fails to reach the compression start position Xp within the set filling incomplete time Ts due to, for example, a combination of the type of the low fluidity molding material and the shape of the mold cavity, compression molding by performing the compression process becomes possible. Thus, it is possible to reduce molding defects due to shortage of resin, thereby increasing the yield of molded products.

In such an injection molding method (injection molding machine M) according to the present embodiment, the predetermined mold gap Lg is provided beforehand between the movable mold Dm and the stationary mold Dc of the mold D by the mold clamping device Mc; the mold clamping pressure Pc is set to zero and the predetermined back pressure Pb is set for the movable mold Dm; subsequently, the injection device Mi is caused to injection the molten resin Rm into the mold D for which the mold gap Lg, the mold clamping pressure Pc, and the back pressure Pb have been set; and, when a certain injection end condition set beforehand is satisfied as a result of progress of the injection filling process, the filling end process for ending the injection filling process is performed. Thus, filling of the resin into the cavity of the mold D can be performed smoothly despite the molding material (the molten resin Rm) being low in fluidity (high in viscosity).

As a result, it is possible to suppress generation of molding defects due to shortage of resin and generation of variation among molded products (deterioration of homogeneity), thereby improving the quality of molded products, to avoid the problem that molding (production) becomes difficult depending on the type of the molding material R, and to expand the range of molding materials R which can be used for injection molding, thereby enhancing universality and evolvability for objects to be molded. In addition, since a sudden mold opening behavior due to the back pressure can be prevented, a natural flow can be realized.

In addition, since the flow resistance produced when the molten resin Rm is injected and filled into the cavity of the mold D can be reduced, and, consequently, the molding cycle can be shortened, energy saving characteristics can be further enhanced. Namely, since positive application of mold clamping force (drive force) to the mold clamping device Mc at the time of injection filling becomes unnecessary, energy consumption can be reduced greatly, and the structure of the mold clamping mechanism can be simplified, which contributes to cost reduction through reduction of components.

The preferred embodiment has been described in detail. However, the present invention is not limited to such embodiment, and, as to structures of details, shapes, materials, quantities, numerical values, etc., alteration, addition, and deletion can be performed arbitrarily within a range not departing from the gist of the present invention.

For example, although it is desired that a low fluidity molding material is used as the molten resin Rm (the molding material R), basically, various types of molding material R, including high fluidity molding materials and low fluidity molding materials can be used. Also, the condition that the movable mold Dm reaches the compression start position Xp set beforehand or the condition that the filling incomplete time Ts set beforehand elapses after start of the injection filling process (S7) is used as the injection end condition (S9). However, this does not exclude the case where a cooling process is performed, without performing the compression process, after having reached the set predetermined position, and the mold is left as it is. Furthermore, although it is the best that the injection device Mi and the mold clamping device Mc are driven by the hydraulic circuit 3 including the hydraulic pump 3p, other drive sources and drive circuits are not excluded. Accordingly, although it is desired to drive the injection device Mi and the mold clamping device Mc by the common hydraulic pump 3p, the method of driving the injection device Mi and the mold clamping device Mc is not limited to this drive method. Meanwhile, the illustrated mold clamping device Mc is configured to include the movable platen 5 which is supported by the tie bar mechanism section 4 to be movable forward and rearward and which supports the movable mold Dm, the mold clamping platen 7 which is supported by the tie bar mechanism section 4 to be movable forward and rearward and which includes the mold clamping drive mechanism section 6 for performing clamping of the movable mold Dm, and the chuck mechanism section 8 which is integrally provided on the mold clamping platen 7 and can fix the mold clamping platen 7 at a predetermined position on the tie bar mechanism section 4. However, various types of mold clamping devices having the same function can be utilized. Therefore, although it is desired that the mold clamping cylinder 6c is used in the mold clamping drive mechanism section 6 and the meter-out circuit 9 is connected to the mold clamping cylinder 6c, this can be replaced with other circuits exhibiting the same function.

INDUSTRIAL APPLICABILITY

The injection molding method and the injection molding machine according to the present invention can be used as various types of injection molding machines which plasticize various types of molding materials and inject and fill the molding materials into molds, thereby performing molding, and as injection molding methods used in these injection molding machines.

REFERENCE SIGNS LIST

2: molding machine controller, 3: hydraulic circuit, 3p: hydraulic pump, 4: tie bar mechanism section, 5: movable platen, 6: mold clamping drive mechanism section, 6c: mold clamping cylinder, 7: mold clamping platen, 8: chuck mechanism section, 9: meter-out circuit, M: injection molding machine, Mi: injection device, Mc: mold clamping device, Rm: molten resin, D: mold, Dm: movable mold, Dc: stationary mold, Lg: mold gap, Pb: back pressure, Fc: mold clamping control means, Fi: injection control means, Xp: compression start position

CITATION LIST

Patent Literature 1 WO2011/161899

The invention claimed is:

1. An injection molding method for performing molding by injecting and filling a plasticized molten resin by an injection device into a mold clamped by a mold clamping device, the injection molding method comprising:
   providing a predetermined mold gap beforehand between a movable mold and a stationary mold of the mold by the mold clamping device;
   setting a predetermined back pressure for the movable mold before starting injection of the molten resin;
   maintaining an absence of positive mold clamping force at a beginning of said injecting and filling;
   subsequently, starting injection of the molten resin by the injection device into the mold for which the mold gap, the absence of positive mold clamping force, and the back pressure have been set;
   applying the predetermined back pressure for the movable mold to resist movement of the movable mold during injection and filling such that the movable mold is allowed to gradually retreat in response to filling pressure against the applied predetermined back pressure; and
   performing, when a predetermined injection end condition set beforehand is satisfied as a result of progress of an injection filling process, a filling end process of ending the injection filling process,
   wherein the positive mold clamping force is applied by the mold clamping drive mechanism, and the predetermined back pressure for the movable mold is applied via a meter-out circuit that is independent of the mold clamping drive mechanism,
   wherein the molten resin is a low fluidity molding material, and
   wherein the predetermined injection end condition is that the movable mold reaches a compression start position set beforehand, and the filling end process includes a compression process of pressurizing the resin within the mold by the movable mold.

2. The injection molding method according to claim 1, wherein the injection device and the mold clamping device are driven by a hydraulic circuit including a hydraulic pump.

3. The injection molding method according to claim 2, wherein the injection device and the mold clamping device are driven by a common hydraulic pump.

\* \* \* \* \*